(12) United States Patent
Ayoub (10) Patent No.: US 7,943,865 B2
(45) Date of Patent: May 17, 2011

(54) DEVICE FOR ISOLATION OF ELECTRICAL COMPONENTS

(76) Inventor: Ihab Ayoub, Houston, TX (US)

( * ) Notice: Subject to any disclaimer, the term of this patent is extended or adjusted under 35 U.S.C. 154(b) by 126 days.

(21) Appl. No.: 11/566,676

(22) Filed: Dec. 4, 2006

(65) Prior Publication Data

US 2007/0144759 A1 Jun. 28, 2007

Related U.S. Application Data

(60) Provisional application No. 60/597,461, filed on Dec. 4, 2005.

(51) Int. Cl.
*H05K 7/14* (2006.01)
(52) U.S. Cl. .............. 174/535; 174/50; 174/59
(58) Field of Classification Search .......... 174/50, 174/53, 520, 59, 535
See application file for complete search history.

(56) References Cited

U.S. PATENT DOCUMENTS

| 5,087,794 A * | 2/1992 | Nelson .................... 174/561 |
| 7,242,574 B2 * | 7/2007 | Sullivan .................. 361/679.21 |
| 2006/0065422 A1 * | 3/2006 | Broyles .................... 174/53 |

* cited by examiner

*Primary Examiner* — Hung V Ngo (57) ABSTRACT

A device for creating a relatively isolated environment for protecting dangerous and/or fragile components, particularly electrical components, from the surrounding environment. The device will typically include a front member and base member which may be formed as a unitary body. A relatively isolated environment will be formed in the area behind the front member and above the base member and the isolation may be enhanced by placing the device near a wall or partition. The device may also include side members for enhancing the isolation of the internal environment. Openings or slots may be located in any of the members to permit the passage of cables or other tubular objects and also to provide ventilation. Retaining elements disposed on the inside of the base member or front member may be used to retain various components in a desired position. The front member may also include a fan or comfort elements for use as a footrest or cooling device.

15 Claims, 7 Drawing Sheets

DEVICE FOR ISOLATION OF ELECTRICAL COMPONENTS

CROSS-REFERENCE TO RELATED APPLICATIONS

This application claims priority to U.S. Provisional Patent Application No. 60/597,461, "DEVICE FOR ISOLATION OF ELECTRICAL COMPONENTS" filed on Dec. 4, 2005, and hereby incorporated by reference.

BACKGROUND OF INVENTION

1. Field of the Invention

The invention relates generally to apparatus for isolation of cables, adapters, power sources, and electronics.

2. Background Art

Electrical devices have become nearly ubiquitous in modern society. As technology continues to evolve, more and more electrical devices are purchased and used by consumers in homes, offices, and other environments. By definition, such devices require an electrical power source to operate. Typically the electrical power source will provide power to electrical devices through one or more cables.

Furthermore, many of today's electrical devices will also be configured to communicate with other devices. This communication is also typically achieved through the use of cables.

Although cables are an effective means of transmitting power and/or data signals, they are also vulnerable and hazardous. For instance, where cables are disposed in areas in which contact with an individual or creature or possible, the cable, individual or creature, and connected equipment are all subject to damage due to potential interactions. Furthermore, signal and power transmission through cables may adversely affect nearby equipment. Finally, unintended interactions with cables and other electrical components may result in loss of power to one or more components, with possible undesirable consequences. Accordingly, there is exists a need for a cost-effective device that can provide a desired degree of isolation for such cables, adapters, power sources, and other electrical devices.

SUMMARY OF INVENTION

In one embodiment, the invention comprises a device for providing a degree of isolation for one or more electrical components and/or other potentially hazardous and/or fragile objects. The device includes a front and base member and may also include one or more side members, as well as retaining elements disposed for retaining the electrical components in a desired location within the device.

In one embodiment, the invention comprises a method for manufacturing a device for providing a degree of isolation for one or more electrical components and/or other potentially hazardous and/or fragile objects.

Other aspects and advantages of the invention will be apparent from the following description and the appended claims.

DETAILED DESCRIPTION

As used herein, the term "isolation" means an increased state of physical, thermal, magnetic, and/or other form of separation between an object and another object or an environment. Isolation may occur through the provision of a physical barrier and/or the provision of a magnetic, thermal, and/or electrical barrier. "Relative isolation" refers to any change in a level of isolation. Other meanings of the term "isolation" which are not incompatible with the spirit of the invention may also apply. Furthermore, other meanings of the term "isolation" may be implicit in the following description.

As used herein, "electrical component" means any thing known in the art to carry and/or utilize an electrical signal. Thus, anything that conveys, stores, and/or utilizes electrical power, data, and/or other signals falls within the scope of this term. Such things include, but are not limited to, power outlets, surge protectors, adapters, modems, computers, and cables. Other definitions which do not depart from the spirit of the invention may also apply.

Figure 1:
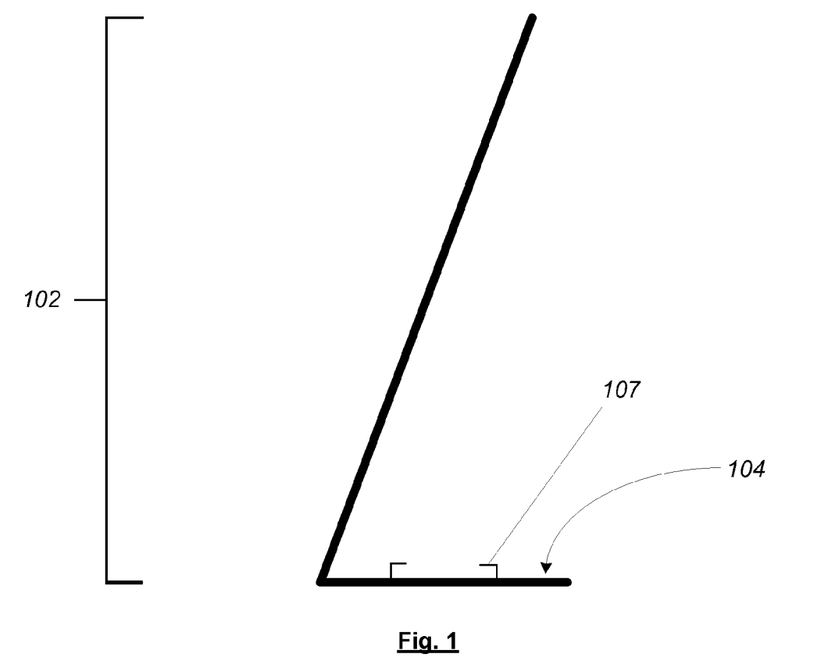
FIG. 1 shows one embodiment of the invention, including retaining elements disposed within an internal environment thereof.

As shown in FIG. 1, in one embodiment the invention comprises a front member 102 and a base member 104. The front member 102 is operatively connected to the base member 104. The operative connection between the front member 102 and base member 104 may be of any type known in the art, and the two members 102,104 may be formed as a single unitary body. The operative connection between the front member 102 and base member 104 may be configured such that the front member 102 is disposed at any desired angle with respect to the base member 104, and furthermore may be configured to provide a variable angle (e.g., hinged, etc.) or to be reversible.

The base member 104 may be of any desired configuration, and need not conform with the front member 102 in terms of depth, width, material, thickness, and/or any in any other fashion. In one embodiment, the base member 104 will have an increased weight to provide an increased stability. In one embodiment, the base member comprises an outlet strip, surge protector, or other electrical component.

In one embodiment, a bottom surface of the base member 104 will be configured to provide an increased stability on a predetermined substrate. For example, the bottom surface may be coated with a non-skid or cushioning material to prevent undesired displacement.

In one embodiment an upper surface of the base member 104 will be configured to retain, stabilize, and/or protect one or more objects expected to be disposed thereupon. For example, such a surface may be coated with or comprise a non-skid material, cushioning material, magnetically and/or electrically-shielded material, etc., and may also include one or more retaining elements or connectors therefore, for maintaining a desired position or configuration of objects disposed thereupon. Such objects may include electrical equipment, cables, surge protectors, electrical outlets, modems, and/or any other items.

The base member 104 may also include one or more holes, which may be threaded to operatively connect a retaining element. As used herein, "retaining element" is used generically to mean any element that is used to fix a component to a surface or to support a component in a relatively fixed location relative to an operatively connected surface. Retaining elements may include, but are not limited to, screws, bolts, clips, supports, slots, flexible ties, adhesives, and any other elements or combinations thereof having a similar functionality. Other members may also be configured to operatively connect to retaining elements.

Furthermore, it may be desirable in certain embodiments to configure a bottom surface of the base member 104 such that it is easily slideable, such that when placed on a substrate it may be more easily positioned. One or more wheels may be operatively connected to the base member 104 to facilitate positioning. In one embodiment, the base member 104 may comprise and/or be coated with a material which will facilitate sliding on a predetermined surface. One or more edges of the base member 104 may also be tapered or otherwise configured such that objects may be disposed upon an upper surface thereof by sliding the base member 104 under any such objects. For instance, the base member 104 may include a tapered edge for sliding under objects disposed on a surface along which the base member 104 is moved.

In one embodiment, it may also be desirable to dispose one or more feet or other such elements on a bottom surface of the base member 104 such that it is elevated and/or stabilized. Elevation of the base member 104 may advantageously allow for greater ventilation, particularly if one or more openings are included in the base member 104. Such openings, in addition to providing ventilation, may advantageously function as points for operatively connecting retaining elements 107.

Figure 2:
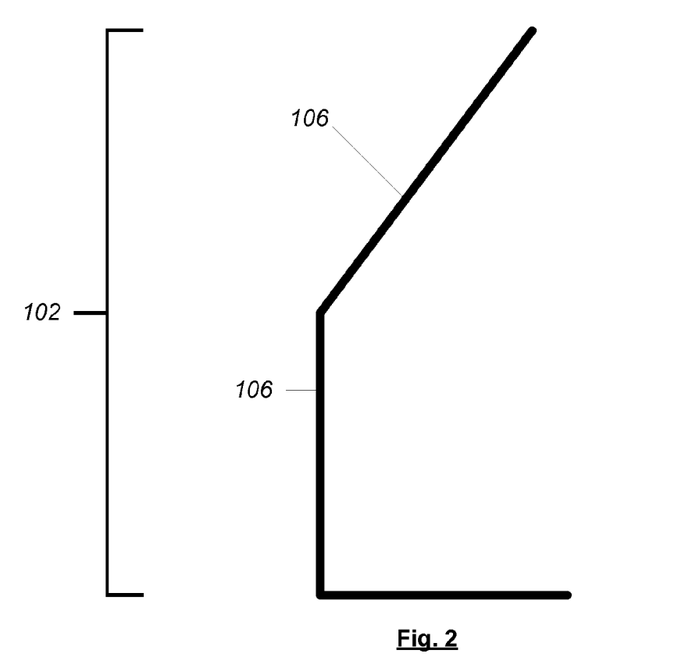
FIG. 2 shows one embodiment of the invention, wherein the front member comprises multiple sub-members.
Figure 3:
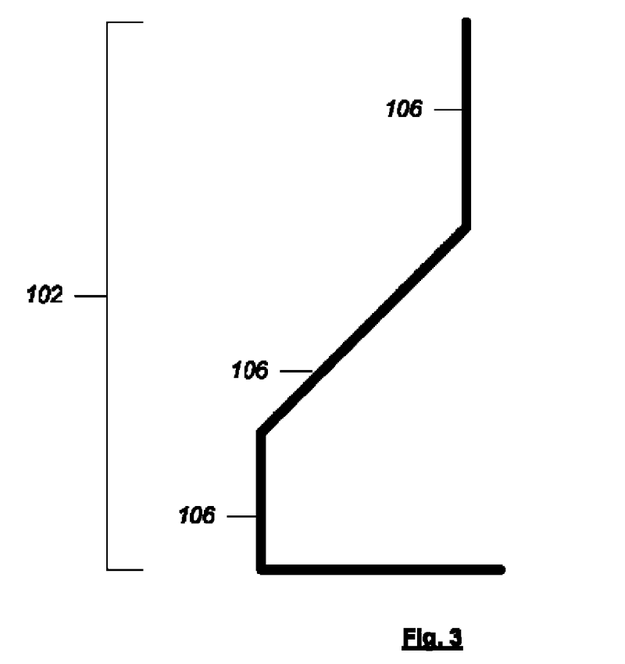
FIG. 3 shows one embodiment of the invention, wherein the front member comprises multiple sub-members.

As shown in the embodiments of FIGS. 2-3, the front member 102 may comprise any number of facets and/or sub-members 106. Any number of sub-members 106 may be used and the operative connection between sub-members 106, and between sub-members 106 and other members, may be of any type known in the art. Furthermore, The operative connections between sub-members 106 may be of any type known in the art, including but not limited to, formation as a unitary body and hinged and/or reversible connections. Furthermore, each sub-member 106 may be disposed at any angle relative to any other sub-member 106.

Figure 4:
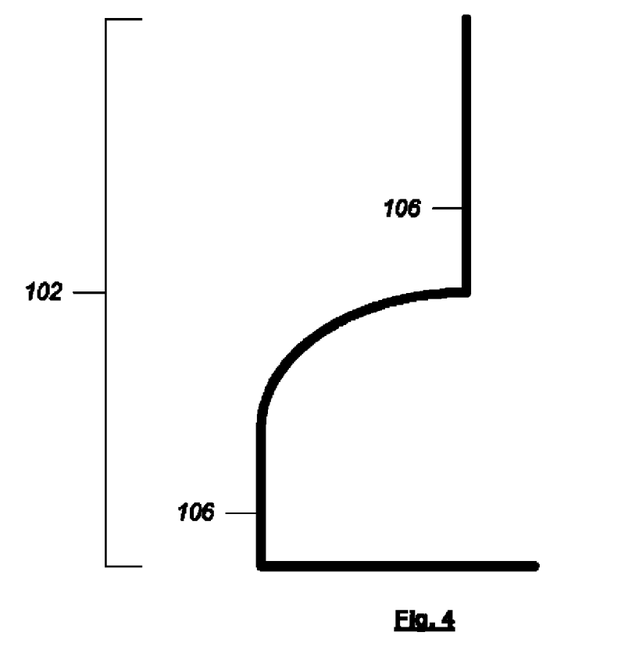
FIG. 4 shows one embodiment of the invention, wherein the front member comprises multiple sub-members, one of which has a curved configuration.

As shown in the embodiment of FIG. 4, sub-members 106 may also have curved surfaces (in any desired dimension). The surfaces of any one or more members 102, 104 and/or sub-members 106 may also include a decorative design and/or may include openings for ventilation, for operatively connecting retaining elements, and/or for entry and/or egress of desired objects.

In various embodiments, one or more desired members 102, 104, and/or sub-members 106, may include heating and/or cooling elements. Such elements include, but are not limited to, fans. For example, in one embodiment, a fan may be operatively connected to an inner surface of a front member 102, such that warm or cool air may be displaced by the fan through one or more openings in the front member 102. Such a configuration advantageously provides heating or cooling to the external environment, and may also advantageously provide ventilation to components located within the internal environment.

An outer surface of a front member 102 or any sub-member 106 may also include "comfort elements" such as protrusions, dimples, rollers, cushions, or other elements known in the art such that, if positioned in front of a chair, such a surface may advantageously function as a comfortable footrest.

Figure 5:
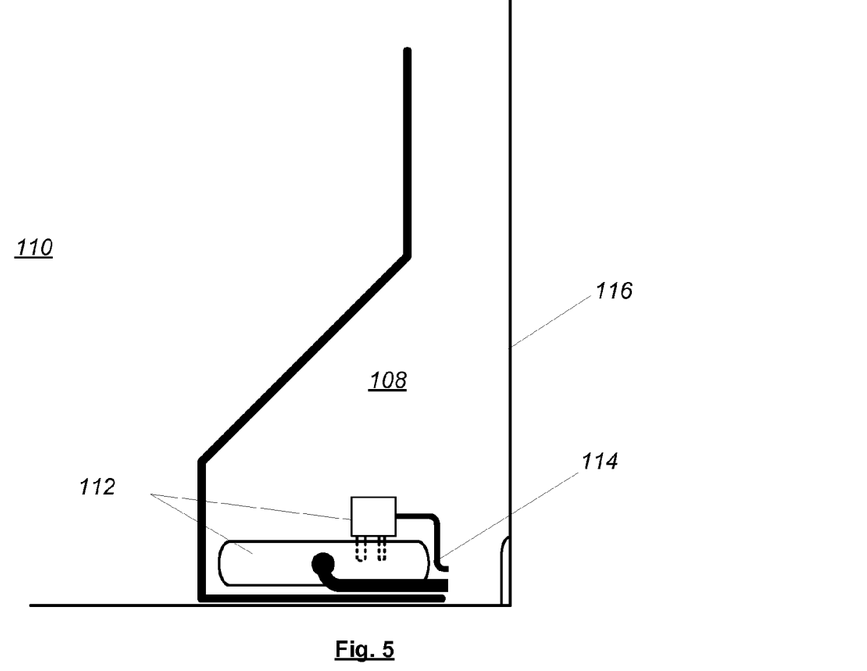
FIG. 5 shows one embodiment of the invention in use with a plurality of electric components.

As shown in the embodiment of FIG. 5, in use the invention provides a barrier between an internal environment 108, to provide a desired type and degree of isolation from an external environment 110. This isolation advantageously permits the placement of relatively delicate and/or potentially hazardous objects in the internal environment 108 to protect them from factors in the external environment 110 and/or minimize hazardous interactions between them and objects and/or creatures in the external environment 110. Electrical components, such as electrical outlets, outlet strips, surge protectors, modems, adapters, and/or other electrical devices 112 and/or cables 114 may benefit from such isolation. In use, disposing embodiments of the invention near a wall 116 or other partition, advantageously provides greater isolation of the internal environment 108.

Figure 6:
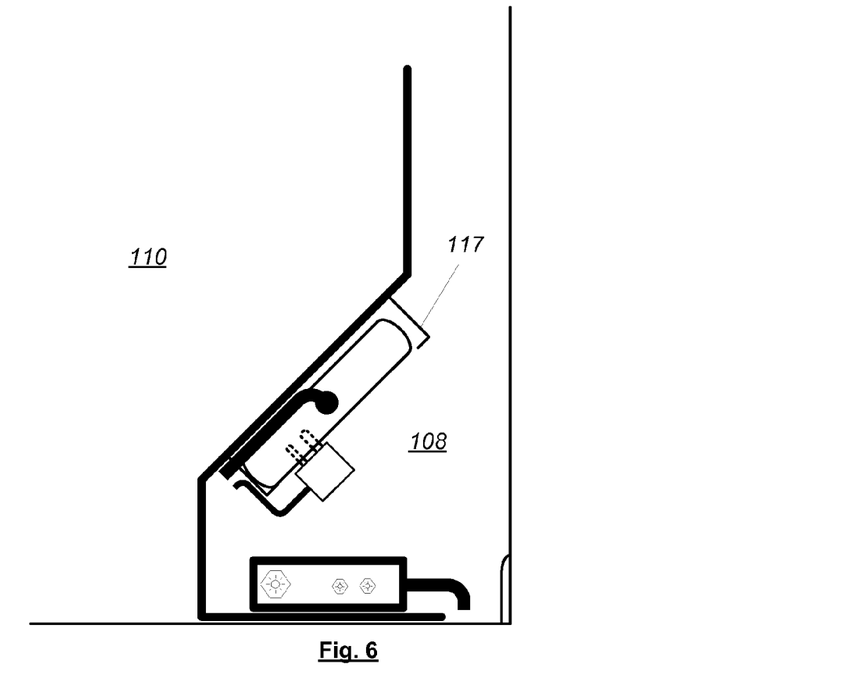
FIG. 6 shows one embodiment of the invention in use with a plurality of electric components.

As used herein, inner surfaces will face the internal environment 108, in use. As shown in the embodiment of FIG. 6, one or more inner surfaces of any member may be configured to retain one or more objects in a desired position. Any approach known in the art may be used to retain such objects in any one or more desired locations. Such approaches include, but are not limited to, retaining elements 117.

Figure 7:
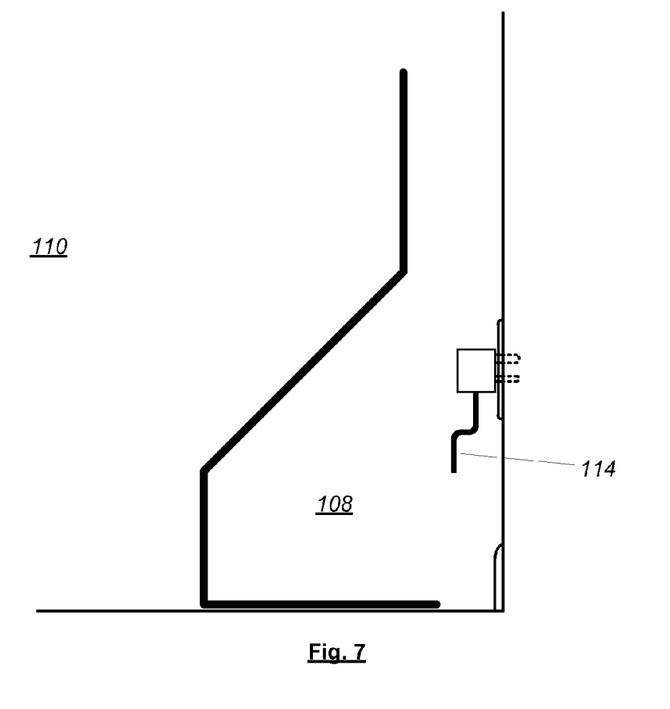
FIG. 7 demonstrates how one embodiment of the invention might be used to provide relative isolation to a wall outlet.

As shown in the embodiment of FIG. 7, the invention may be advantageously used to provide relative isolation of cables 114, wall outlets 118, and/or other potentially fragile and/or hazardous things regardless of whether anything is placed on the base member 104.

Figure 8:
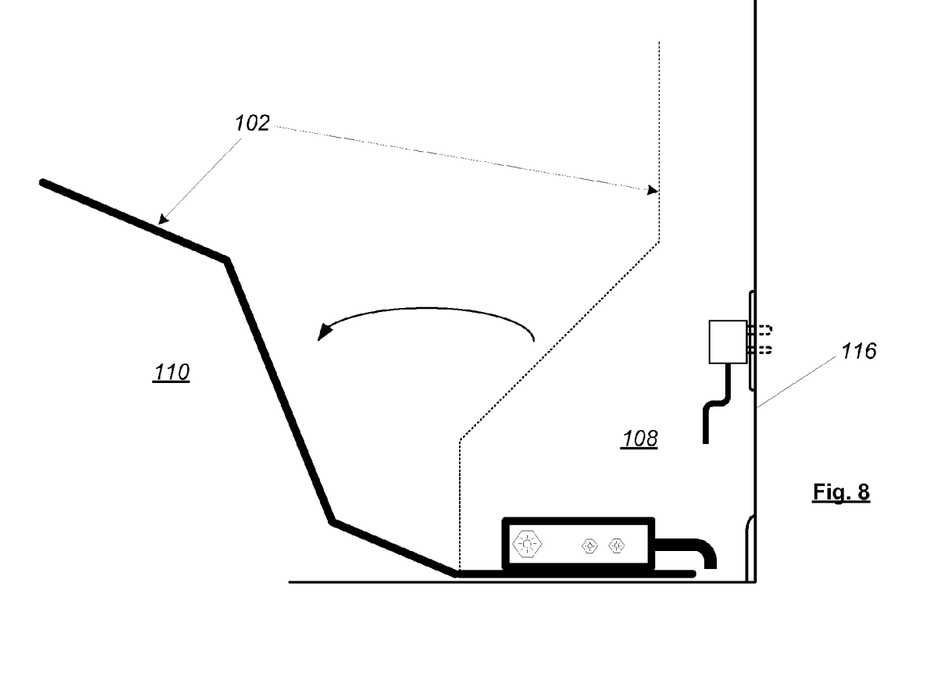
FIG. 8 shows one embodiment of the invention wherein a front member is movable relative to a base member.

As shown in the embodiment of FIG. 8, the operative connection between the front member 102 and base member 104 may include a hinge. Any type of hinge known in the art may be utilized, as well as any configuration which provides the same or a similar function. Such a configuration advantageously permits access to the internal environment 108. The operative connection may allow any desired range of rotation of the front member 102 relative to the base member 104. In one embodiment, this range of will be such that the front member 102 may be stabilized by a nearby wall 116 or similar partition when in a raised position, thereby increasing the isolation of the internal environment 108. In one embodiment, the operative connection between the front member 102 and base member 104 is reversible.

Figure 9:
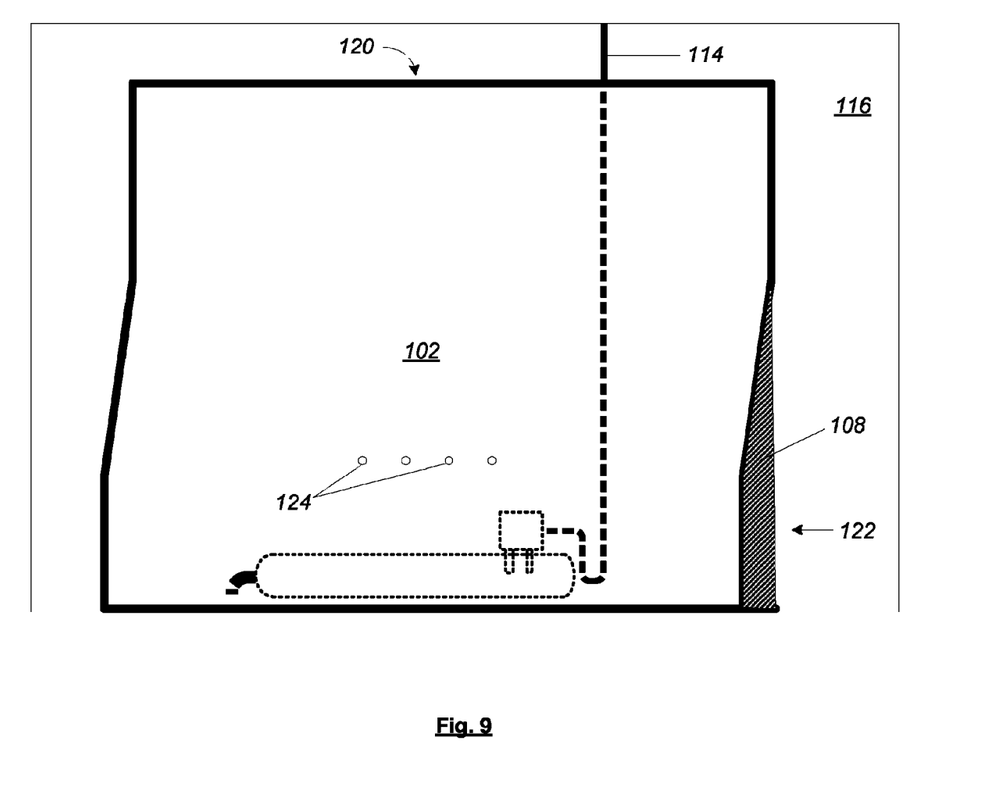
FIG. 9 shows one embodiment of the invention, comprising a plurality of openings.

As shown in the embodiment of FIG. 9, the invention may be disposed such that gaps will exist along the top 120 and/or side 122 permitting the passage of cables 114 and/or other objects, as well as ventilation. Ventilation may also be provided by the disposition of one or more openings 124 in any one or more members. The openings 124 may also advantageously provide attachment points for stabilizing or retaining elements. Furthermore, in one embodiment a top member (not visible in FIG. 9) may be configured to include slots and/or holes such that cables 114 and/or other objects may pass therethrough.

Figure 10:
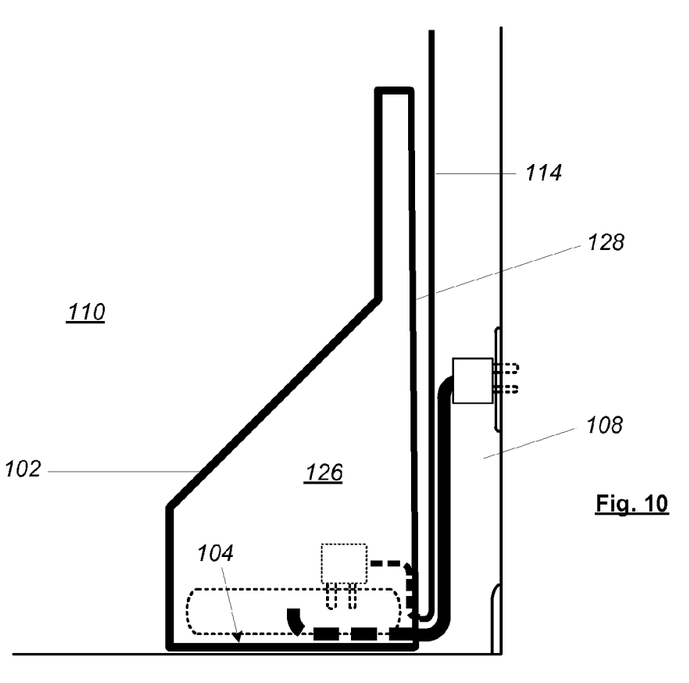
FIG. 10 shows one embodiment of the invention, comprising at least one side member.

Although not required in various embodiments, as shown in the embodiment of FIG. 10, the invention may include side members 126 to further isolate an internal environment 108.

One or more edges 128 of the side members 126 may extend rearwardly (relative to the front member 102) to any desired extent. In one or more embodiments, it may be advantageous to extend any such edges 128 at least as far as the rearward edge of the base member 104, thereby providing an increased isolation of the internal environment 108.

Figure 11:
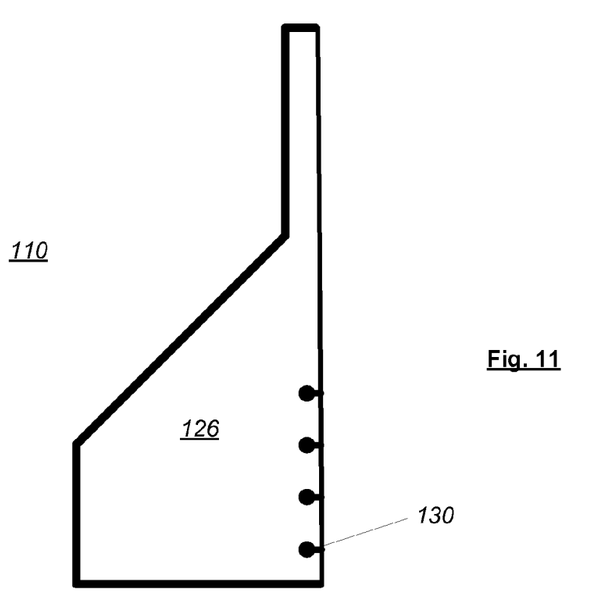
FIG. 11 shows one embodiment of the invention, comprising a plurality of slots for the passage of cables and other objects.

As shown in the embodiment of FIG. 11, one or more slots 130, holes, and/or other openings may be provided in any member of the invention to provide for the passage of cables 114 and other objects, as well as to provide a desired ventilation. Such slots 130 and/or holes may be configured to frictionally retain an object, such as a cable 114, thereby advantageously providing for an increased organization and separation of such objects and furthermore facilitating the placement and retention of unneeded lengths of cable within the internal environment 108.

Figure 12:
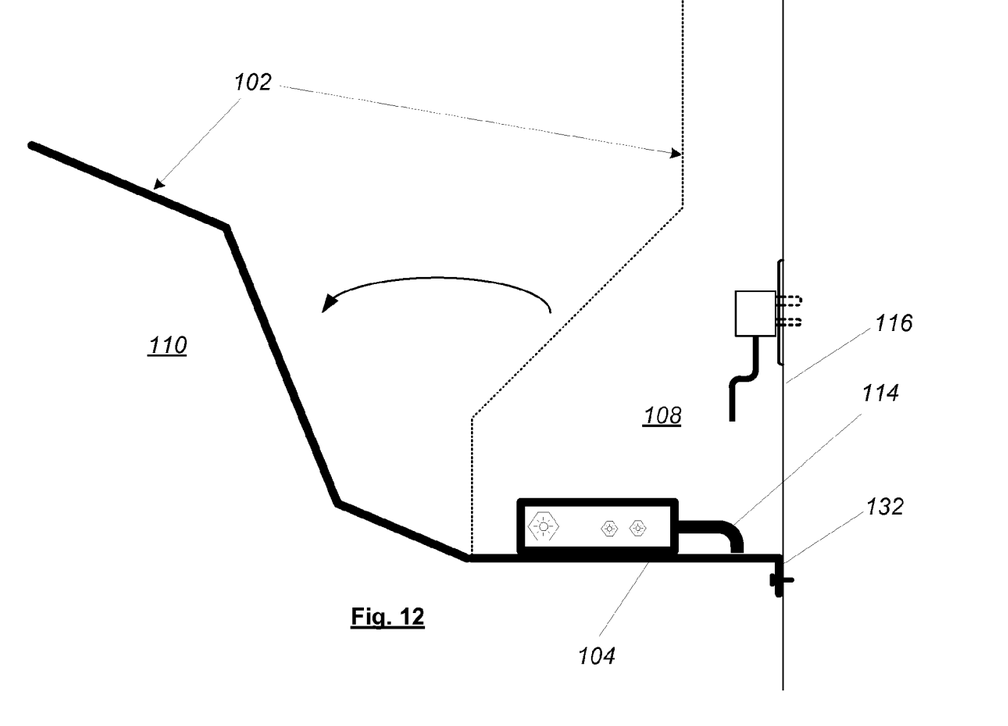
FIG. 12 shows one embodiment of the invention, configured to be operatively connected to a wall or other partition.

As shown in the embodiment of FIG. 12, the invention may be operatively connected to a wall 116 or other partition such that it is supported in an elevated location, and such that it will provide support for any objects placed on a base member 104 thereof, and/or provide a desired degree of isolation of any cables 114 and/or other objects from an external environment 110. In one embodiment, operative connection of the front member 102 to base member 104 may be reversible or include a hinge to permit access to an internal environment 108 thereof without requiring detachment from the wall 116 or other partition. In one embodiment, such an operative connection will occur by connecting only the base member 104 to the wall 116 or other partition. In one embodiment, the base member 104 may be operatively connected to one or more suspension members 132, which in turn may be operatively connected to the wall 116 or partition by any means known in the art. Embodiments of the invention may also be operatively connected to any suitable surface of any desired object.

The various members described herein may comprise any material or combination thereof known in the art. Any desired member may also comprise an insulating material to provide sound and/or thermal insulation to components disposed within the internal environment. Furthermore, such members may be of any size and/or configuration known in the art, and need not conform in terms of size, configuration, style, dimension, composition, or any other variable, with adjacent members. One skilled in the art will understand that a degree of variability is permitted for aesthetic/decorative and/or design purposes, without departing from the spirit of the invention. In one or more embodiments, members or parts thereof may be transparent or partially transparent to allow for the viewing of objects disposed within the internal environment. In one or more embodiments, members may be configured and/or colored to match a wall or partition so as to be less visibly obtrusive. One advantage of embodiments of the invention is the ability to conceal electronic components which might otherwise be visually displeasing. Accordingly, configuration, coloration, and other aspects of embodiments of the invention may be selected to match those of a nearby wall or partition to more effectively conceal both the electronic components, and the embodiment.

Embodiments of the invention advantageously decrease the risk of injury from electric components and other objects, while also providing a degree of protection for any such objects from the surrounding environment. Although embodiments may be used in a variety of locations, one particularly advantageous location might be under a desk, where cables and various other electric components are often disposed and may be damaged or rendered inoperative by an individual's feet, or possibly harm an individual who makes contact with them. Embodiments will also be advantageous in areas where pets and/or children may contact electric components, thereby injuring themselves.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A device for the relative isolation of at least one electric component, comprising:
    a front member;
    a weighted base member having opposing front and rear sides, the front side operatively connected along a substantial portion of a lower edge of the front member such that the front member extends generally upwardly therefrom and is substantially supported thereby;
    at least one selected from a retaining element and an attachment point for a retaining element, operatively connected to an inner surface of at least one selected from the front member and the base member; and
    a substantially unobstructed opening above and bordering the rear perimeter of the base member, sufficient to provide relatively unobstructed physical access to the relatively isolated internal environment from the rear of the device when in use.

2. The device of claim 1, wherein the front member comprises a plurality of sub-members disposed in varying orientations.

3. The device of claim 1, further comprising at least one suspension member operatively connected to the base member.

4. The device of claim 1, wherein the base member comprises at least one electronic component.

5. The device of claim 1, wherein a bottom surface of the base member is configured to be non-skid.

6. The device of claim 1, wherein a bottom surface of the base member is configured to be easily movable on a predetermined substrate.

7. The device of claim 1, wherein the operative connection between the front member and the base member is configured to allow a predetermined rotation of the front member, relative to the base member.

8. The device of claim 1, wherein the operative connection between the front member and the base member is reversible.

9. The device of claim 1, further comprising at least one opening in at least one selected from the base member and the front member.

10. The device of claim 1, further comprising at least one side member.

11. The device of claim 10, wherein the at least one side member comprises at least one selected from an opening and a slot.

12. The device of claim 11, wherein the at least one selected from an opening and a slot is configured to frictionally retain a cable such that any excess cable may be disposed within the relatively isolated environment.

13. The device of claim 1, wherein the base member comprises at least one selected from a surge protector and an outlet strip.

14. The device of claim 1, wherein the front member comprises at least one comfort element.

15. The device of claim 1, wherein a fan is operatively connected to an inner surface of the front member.

* * * * *